US012575483B2

(12) United States Patent
Altepeter et al.

(10) Patent No.: US 12,575,483 B2
(45) Date of Patent: Mar. 17, 2026

(54) SEED BOOT STABILIZER

(71) Applicants:Daniel J. Altepeter, East Grand Forks, MN (US); Andrew Altepeter, Grand Forks, ND (US)

(72) Inventors: Daniel J. Altepeter, East Grand Forks, MN (US); Andrew Altepeter, Grand Forks, ND (US)

( * ) Notice: Subject to any disclaimer, the term of this patent is extended or adjusted under 35 U.S.C. 154(b) by 425 days.

(21) Appl. No.: 18/308,159

(22) Filed: Apr. 27, 2023

(65) Prior Publication Data

US 2024/0357956 A1 Oct. 31, 2024

(51) Int. Cl.
| | |
|---|---|
| *A01C 5/06* | (2006.01) |
| *A01C 7/20* | (2006.01) |
| *F16C 11/04* | (2006.01) |

(52) U.S. Cl.
CPC .............. *A01C 7/201* (2013.01); *A01C 5/064* (2013.01); *F16C 11/04* (2013.01)

(58) Field of Classification Search
CPC ................................ A01C 5/064; A01C 7/201
See application file for complete search history.

(56) References Cited

U.S. PATENT DOCUMENTS

| | | | |
|---|---|---|---|
| 2,299,392 | A | 10/1942 | Johnson |
| 4,217,835 | A | 8/1980 | Fox |
| 4,760,806 | A | 8/1988 | Bigbee |
| 6,209,466 | B1 | 4/2001 | Wodrich |
| 7,617,782 | B2 | 11/2009 | Sheppard |
| 7,856,934 | B2 | 12/2010 | Hagny |
| 8,141,503 | B2 | 3/2012 | Wipf |
| 8,267,021 | B2 | 9/2012 | Mariman |
| 8,499,703 | B2 | 8/2013 | Hagny |
| 8,616,140 | B1 | 12/2013 | Wipf |
| 9,485,903 | B1 * | 11/2016 | Wipf ...................... A01C 7/201 |

(Continued)

FOREIGN PATENT DOCUMENTS

| | | |
|---|---|---|
| CA | 1299028 C | 4/1992 |
| CA | 2277763 A1 | 11/2000 |

(Continued)

OTHER PUBLICATIONS https://talk.newagtalk.com/forums/thread-view.asp?tid=51045&mid=359340#M359340; AgTalk Message Board Thread 750/185—John Deere Seed Boot Hole Fix, One More Time Please?; Apr. 16, 2008.

(Continued)

*Primary Examiner* — Matthew R Buck
(74) *Attorney, Agent, or Firm* — Neustel Law Offices

(57) ABSTRACT

A seed boot stabilizer configured to reduce movement of a seed boot may include a first segment, a second segment, and a third segment. The first segment may include a first end configured to be coupled to the seed boot and a first planar face configured to extend away from an upper portion of the seed boot. The second segment is coupled to the first segment and may have a second planar face oriented at a first angle with respect to the first planar face of the first segment. The third segment is coupled to the second segment and may have a third planar face oriented at a second angle with respect to the second planar face of the second segment, the third segment including a second end configured to be coupled to the main arm to reduce movement of the seed boot.

20 Claims, 12 Drawing Sheets

(56) References Cited

U.S. PATENT DOCUMENTS

| | | | |
|---|---|---|---|
| 9,686,908 | B2 | 6/2017 | Mead |
| 2010/0300337 | A1 | 12/2010 | Wipf |
| 2015/0075826 | A1 | 3/2015 | Ryan |
| 2015/0334915 | A1 | 11/2015 | Mead |

FOREIGN PATENT DOCUMENTS

| | | |
|---|---|---|
| CA | 2411041 A1 | 5/2004 |
| GB | 2369028 A | 5/2002 |
| WO | 2014105560 A3 | 4/2014 |

OTHER PUBLICATIONS https://talk.newagtalk.com/forums/thread-view.asp?tid=114517&mid=810818#M810818; AgTalk Message Board Thread "JD 1890 Seed Boot Mounting Holes"; Aug. 14, 2009.

https://talk.newagtalk.com/forums/thread-view.asp?tid=148146&DisplayType=nested&setCookie=1; AgTalk Message Board Thread "More pictures of the JD 1590 issue(s)."; Feb. 2, 2010.

https://www.no-tillfarmer.com/articles/3908-tackling-residue-and-scoring-with-accuracy; No-Till Farmer Article "Tackling Residue And Scoring With Accuracy"; Dec. 1, 2014.

https://www.no-tillfarmer.com/articles/4507-tinkering-for-no-till-perfection?v=preview; No-Till Farmer Article "Tinkering For No-Till Perfection"; Mar. 20, 2015.

https://talk.newagtalk.com/forums/thread-view.asp?tid=643600 &DisplayType=flat&setCookie=1; AgTalk Message Board Thread "1890 Boot Stabilizer from Pro-Sticth ag"; Apr. 8, 2015.

https://talk.newagtalk.com/forums/thread-view.asp?tid=600997 &DisplayType=flat&setCookie=1; AgTalk Message Board Thread "1890 seed boot "egging out" repair"; Dec. 27, 2015.

https://talk.newagtalk.com/forums/thread-view.asp?tid=692139 &DisplayType-flat&setCookie=1; AgTalk Message Board Thread "Prostitch seed boot stabilizer"; Mar. 6, 2017.

Needham Ag Technologies, LLC 2018 Product Guide; Published Nov. 15, 2017.

https://www.farmshow.com/a_download_page.php?aid= MjY0OTE=; Farm Show Magazine 2013—vol. #27, Issue #2, p. #29; "Mud-X Gauge Wheel Eliminates Plugging"; 2013.

https://web.archive.org/web/20130514192632/http://www.prostitchag.com/; The Wayback Machine Archive.org Website for http://www.prostitchag.com/ "Pro-Stitch Closing Wheels & Mud-X Gauge Wheels—Home"; May 14, 2013.

https://rede-ag.com/wp-content/uploads/2020/12/Boot_Stabilizer_Instructions.pdf; Red E Ag Website—ProStitch Ag Boot Stabilizer Instructions; Jan. 24, 2015.

https://web.archive.org/web/20150217103009/prostitchag.com/products.html; The Wayback Machine Archive.org Website for http://prostitchag.com/products.html; "Office Website of Pro-Stitch Closing Wheels"; Feb. 17, 2015.

https://web.archive.org/web/20210624062637/rede-ag.com/prostitch-ag/; The Wayback Machine Archive.org Website for http://rede-ag.com/prostitch-ag/; "Pro-Stitch Ag Parts—Red E Performance Ag Parts"; Jun. 24, 2021.

* cited by examiner

SEED BOOT STABILIZER

CROSS REFERENCE TO RELATED APPLICATIONS

Not applicable to this application.

STATEMENT REGARDING FEDERALLY SPONSORED RESEARCH OR DEVELOPMENT

Not applicable to this application.

FIELD OF THE DISCLOSURE

The described example embodiments in general relate to a stabilizer for a seed boot of an air seeder used in modern agriculture.

BACKGROUND

Modern agriculture relies on large-scale machinery for the successful planting, maintenance, and harvesting of crops. One example is an air planter that automates the process of planting seeds, such as corn. Air planters are devices that move seed from a bin into a furrow formed in the ground for planting the seed. Air planters may be self-propelled or may be drawn behind a tractor. Generally, as the air planter moves over a field, the air planter operates to simultaneously plant numerous rows of seeds (e.g. 12-48 rows) with uniform spacing between rows, and uniform spacing between seeds, and at suitable depths below the ground surface. In this way, large fields may be efficiently and effectively planted using the planter.

Even with proper maintenance, air planters are subject to significant wear and tear during normal operations, and it is not uncommon for some of the components to wear out. For example, air planters generally include a seed boot for each row that the air planter is capable of planting. Each seed boot is subject to substantial contact with the ground as the air planter is moved across the ground, causing stress on the mounting structure that secures the seed boot to the frame of the air planter. Excessive wear and tear of the seed boot mounting structure may result in improper seed placement during planting, as well as failures of the mounting structure that result in replacement costs and undesirable delays in agricultural operations. Accordingly, although desirable results have been achieved using prior art mounting structures for seed boots, there is room for improvement.

SUMMARY

Some of the various embodiments of the present disclosure relate to a seed boot stabilizer that is configured to at least partially reduce movement of a seed boot during the performance of planting operations. Embodiments of seed boot stabilizers in accordance with the present disclosure may provide advantages over prior art assemblies, including reducing wear and tear on one or more components of a mounting assembly that mounts the seed boot to other components of an agricultural machine (e.g. an air planter).

For example, in some embodiments, a seed boot stabilizer for maintaining a stability of a seed boot relative to a main arm of an air planter includes a first segment, a second segment, and a third segment. In some embodiments, the first segment includes a first end configured to be coupled to the seed boot and having a first planar face configured to extend away from an upper portion of the seed boot. In some embodiments, the second segment is coupled to the first segment and has a second planar face oriented at a first angle with respect to the first planar face of the first segment. In some embodiments, the third segment is coupled to the second segment and has a third planar face oriented at a second angle with respect to the second planar face of the second segment, the third segment including a second end configured to be coupled to the main arm to at least partially reduce movement of the seed boot relative to the main arm.

Similarly, in some embodiments, a mounting assembly for a seed boot having a mounting flange proximate a forward end of the seed boot that is pivotably coupled to at least one mounting projection of a main arm, the mounting assembly comprising: a seed boot stabilizer including: a first segment having a first end configured to be coupled to the seed boot proximate a rearward end of the seed boot, the first segment having a first planar face configured to extend away from an upper portion of the seed boot; a second segment coupled to the first segment and having a second planar face oriented at a first angle with respect to the first planar face of the first segment; and a third segment coupled to the second segment and having a third planar face oriented at a second angle with respect to the second planar face of the second segment, the third segment including a second end configured to be coupled to a rearward portion of the main arm to at least partially reduce movement of the seed boot relative to the main arm.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

3

Figure 3:
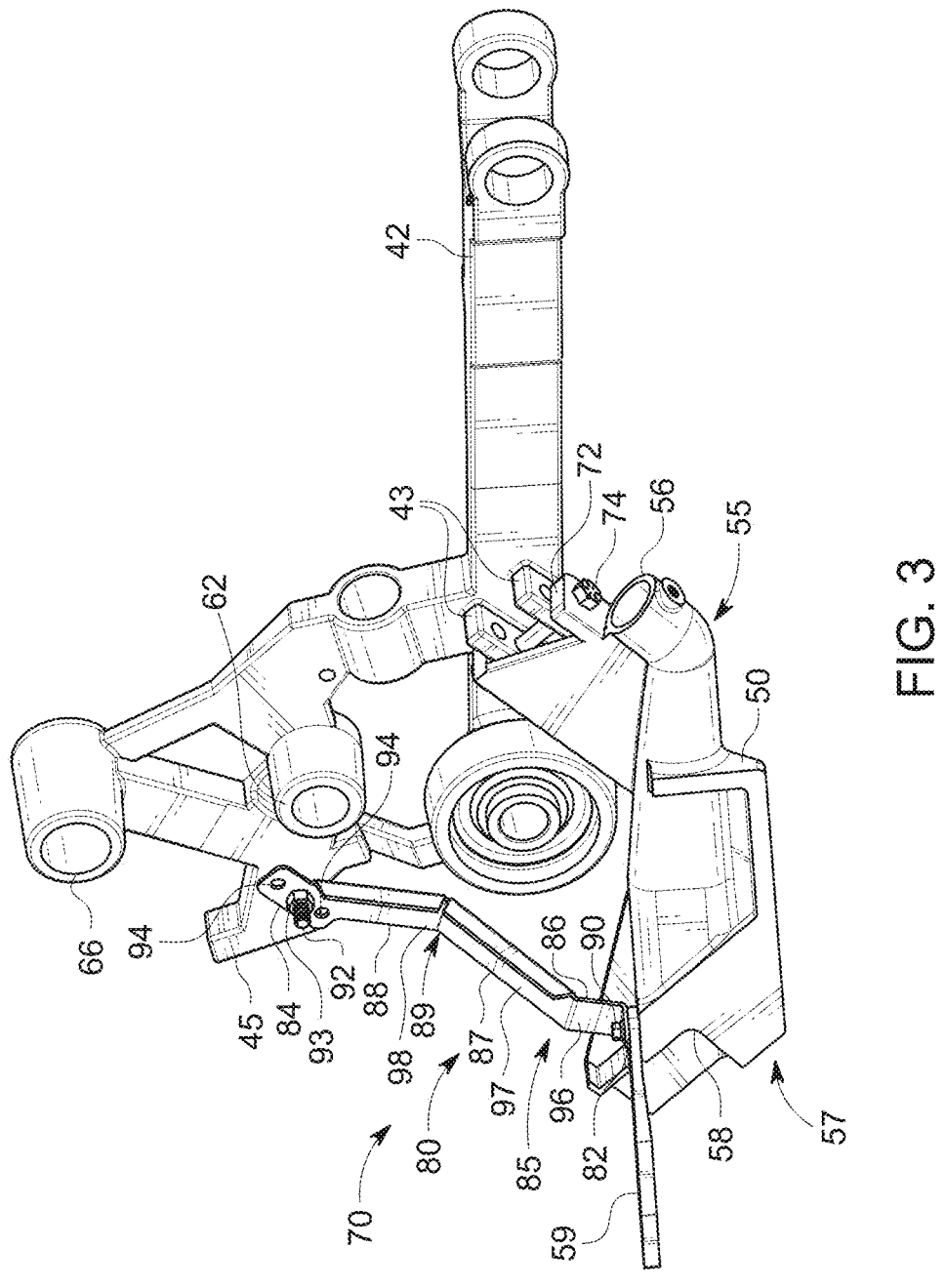
FIG. 3 is a first perspective view of a mounting assembly for a seed boot in accordance with an example embodiment.
Figure 5:
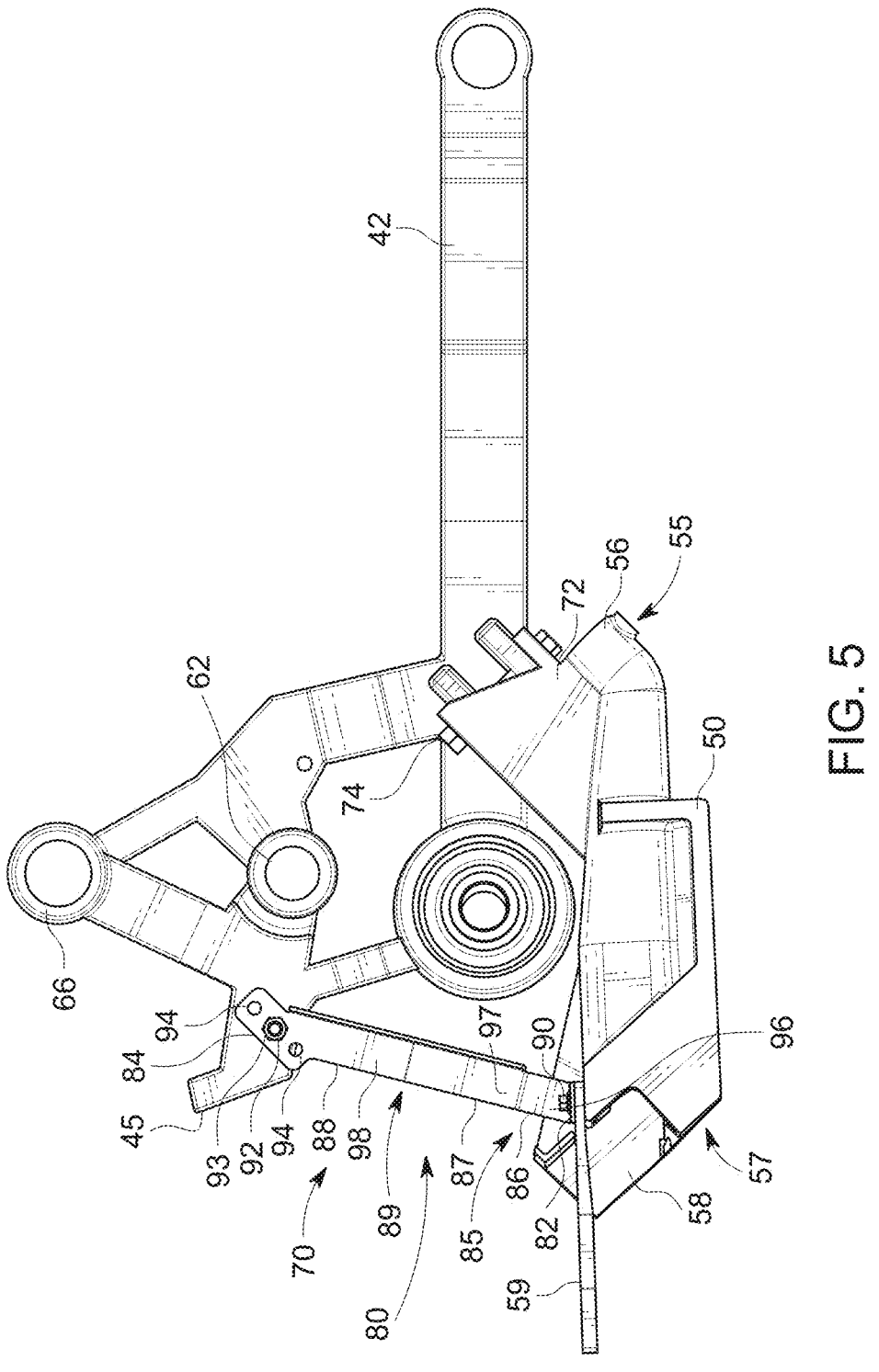

FIG. 5 is a side elevational view of the mounting assembly of FIG. 3 in accordance with an example embodiment.

Figure 6:
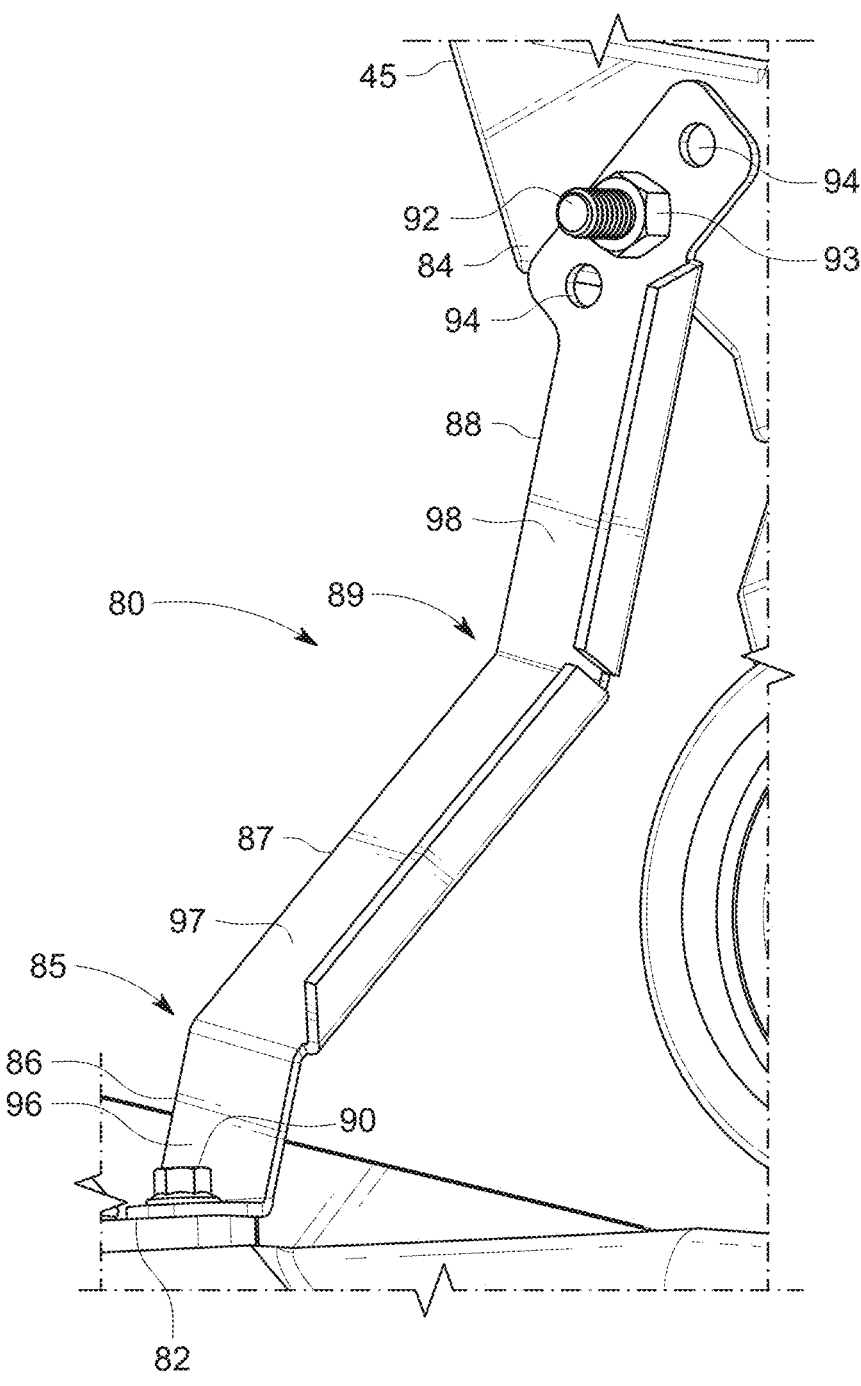

FIG. 6 is an enlarged perspective view of a seed boot stabilizer of the mounting assembly of FIG. 3 in accordance with an example embodiment.

Figure 7:
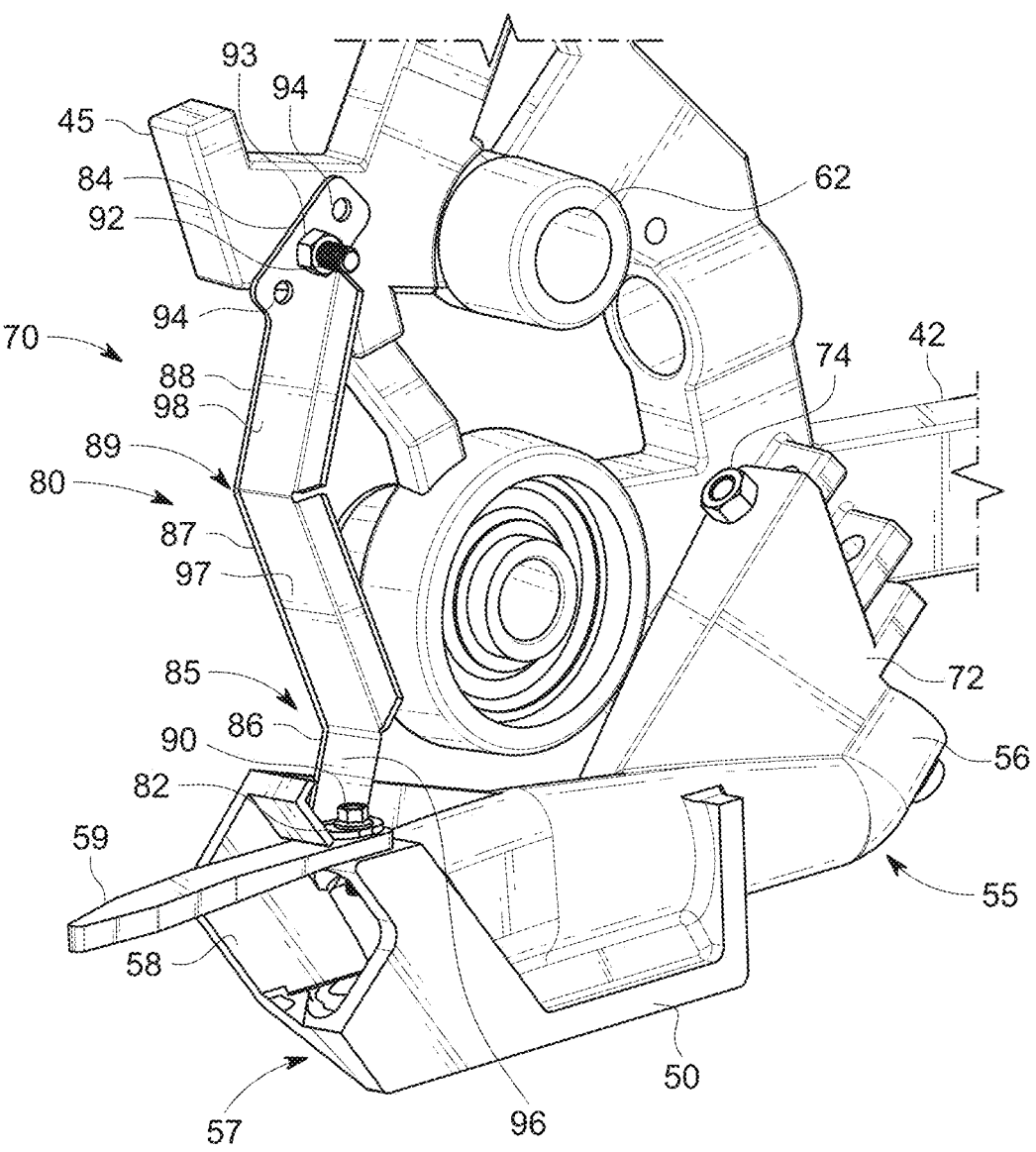

FIG. 7 is a third perspective, partial view of the mounting assembly of FIG. 3 in accordance with an example embodiment.

Figure 8:
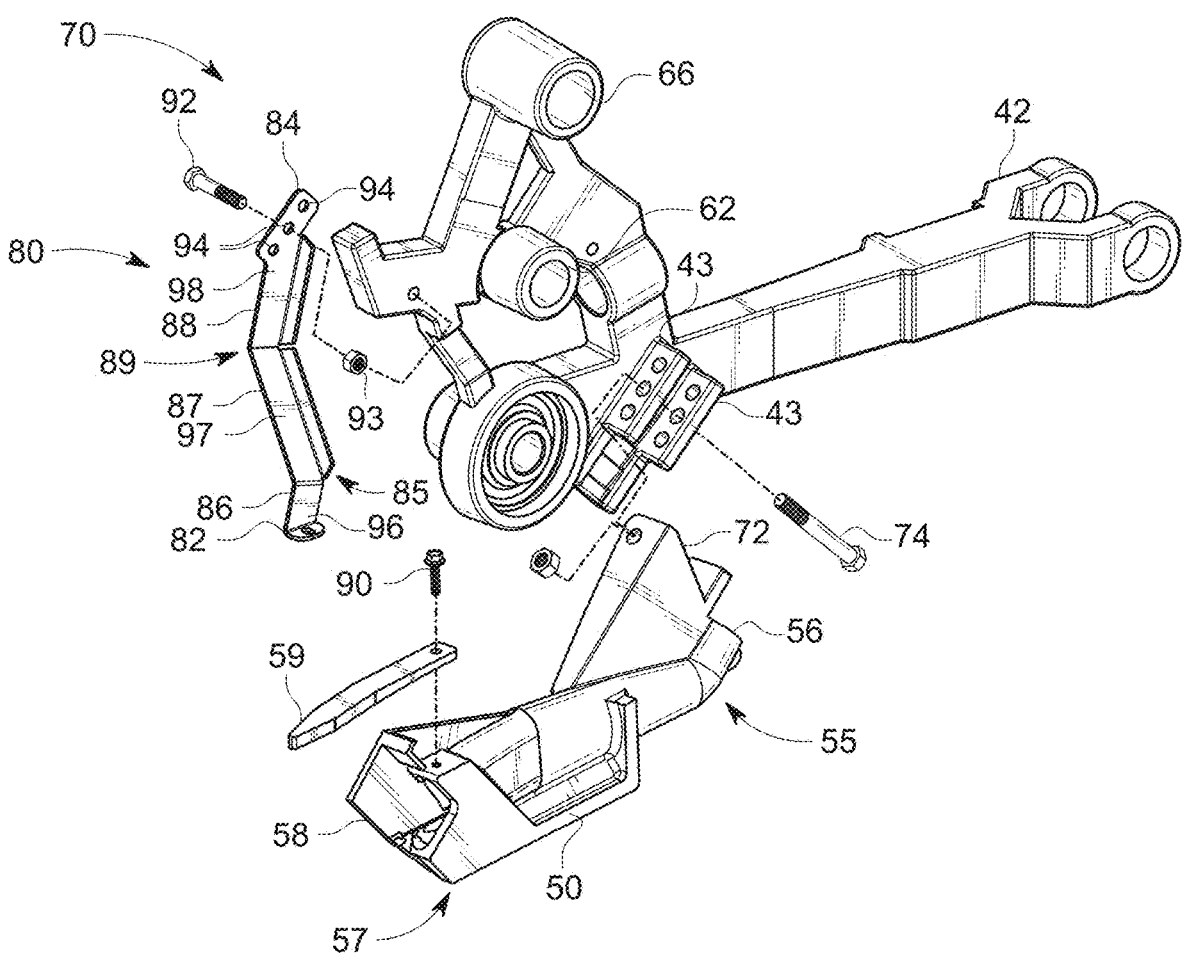

FIG. 8 is an exploded perspective view of the mounting assembly of FIG. 3 in accordance with an example embodiment.

Figure 9:
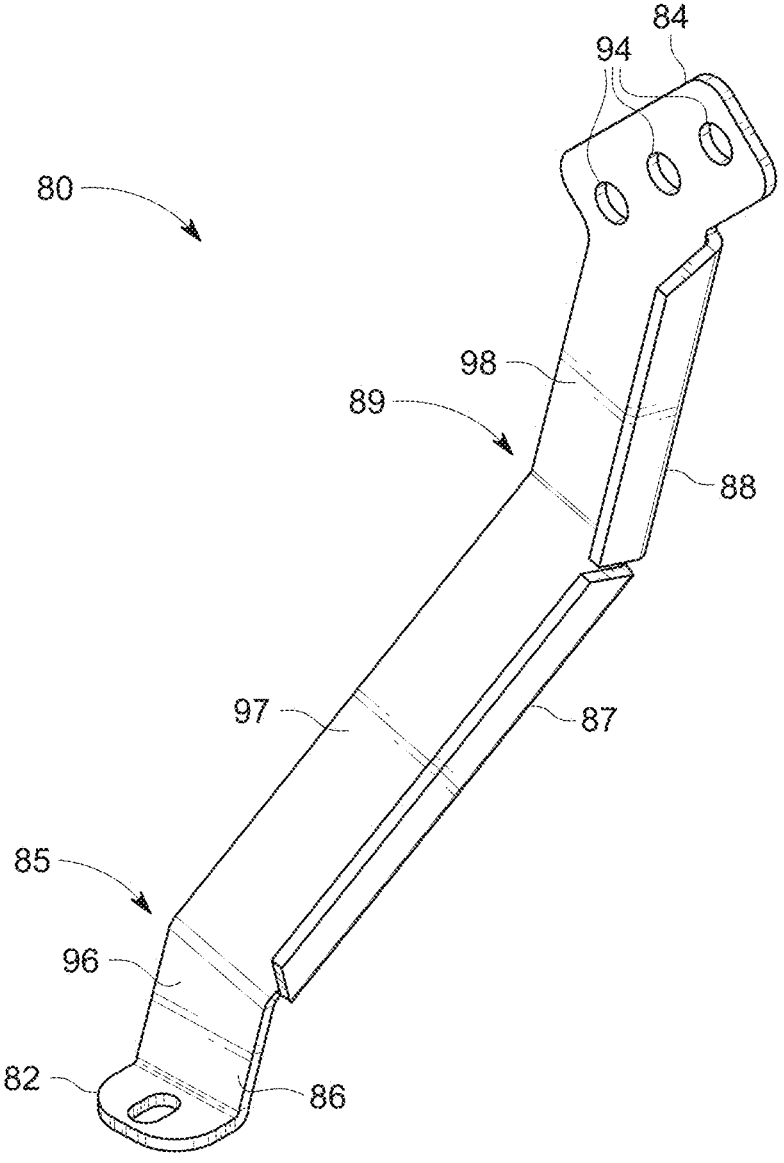

FIG. 9 is a front perspective view of a seed boot stabilizer of FIG. 3 in accordance with an example embodiment.

Figure 10:
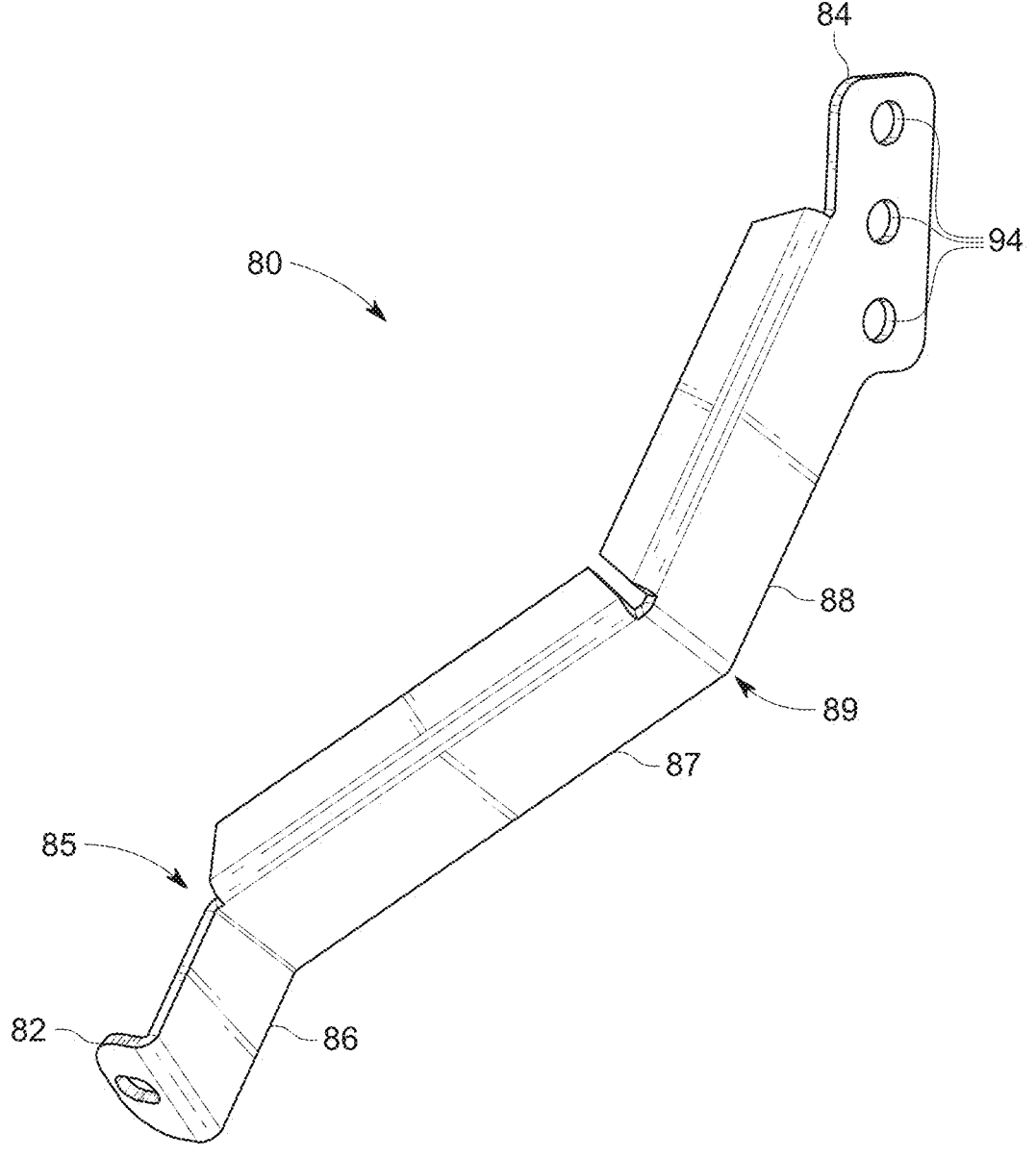

FIG. 10 is a rear perspective view of the seed boot stabilizer of FIG. 3 in accordance with an example embodiment.

Figure 11:
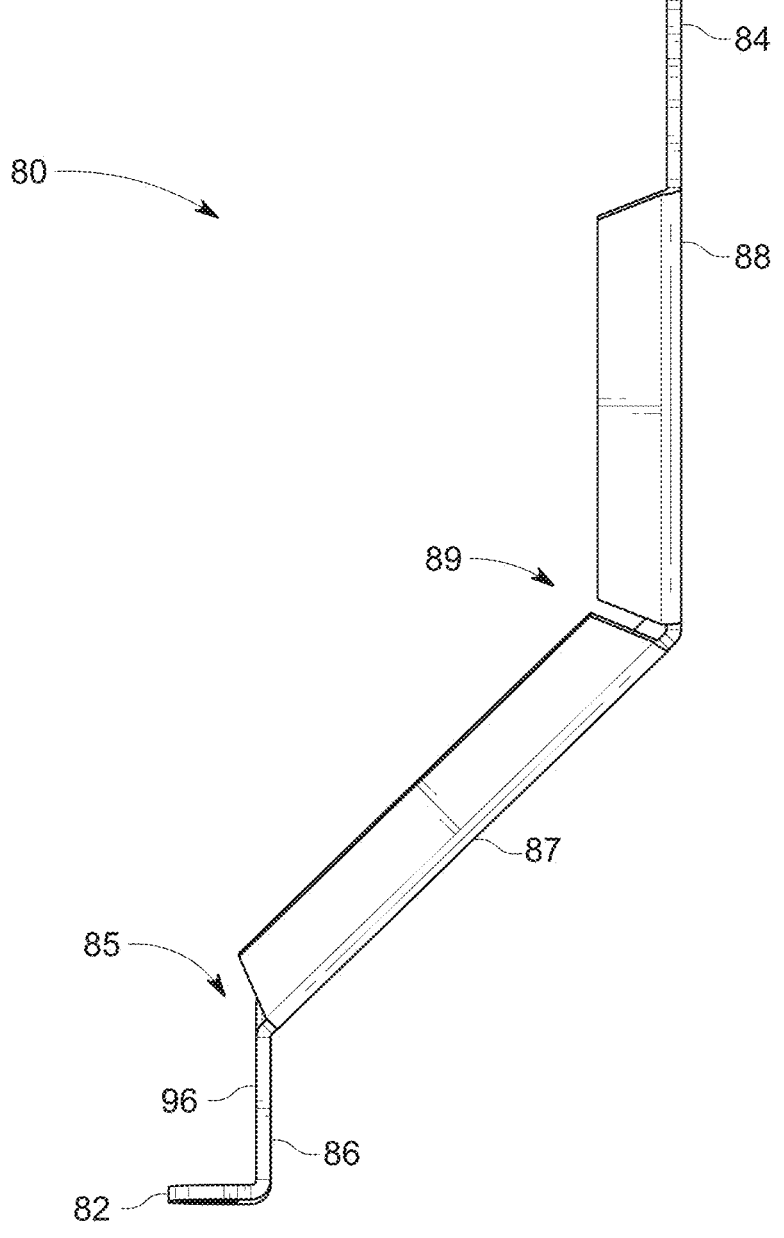

FIG. 11 is a first side elevational view of the seed boot stabilizer of FIG. 3 in accordance with an example embodiment.

Figure 12:
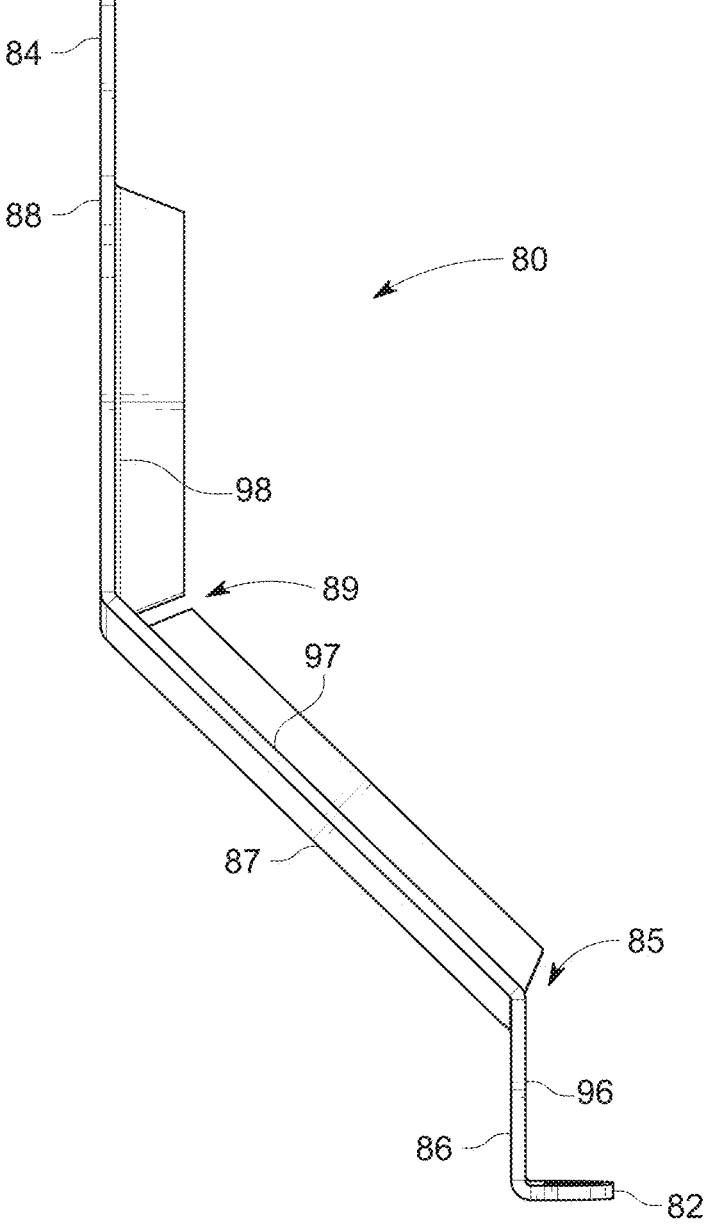

FIG. 12 is a second side elevational view of the seed boot stabilizer of FIG. 3 in accordance with an example embodiment.

DETAILED DESCRIPTION

A. Overview

Some of the various embodiments of the present disclosure relate to a seed boot stabilizer that is configured to at least partially reduce movements of a seed boot during the performance of planting operations. Embodiments of seed boot stabilizers in accordance with the present disclosure may provide advantages over prior art assemblies, including reducing wear and tear on one or more components of a mounting assembly that mounts the seed boot to other components of an air planter.

Figure 1:
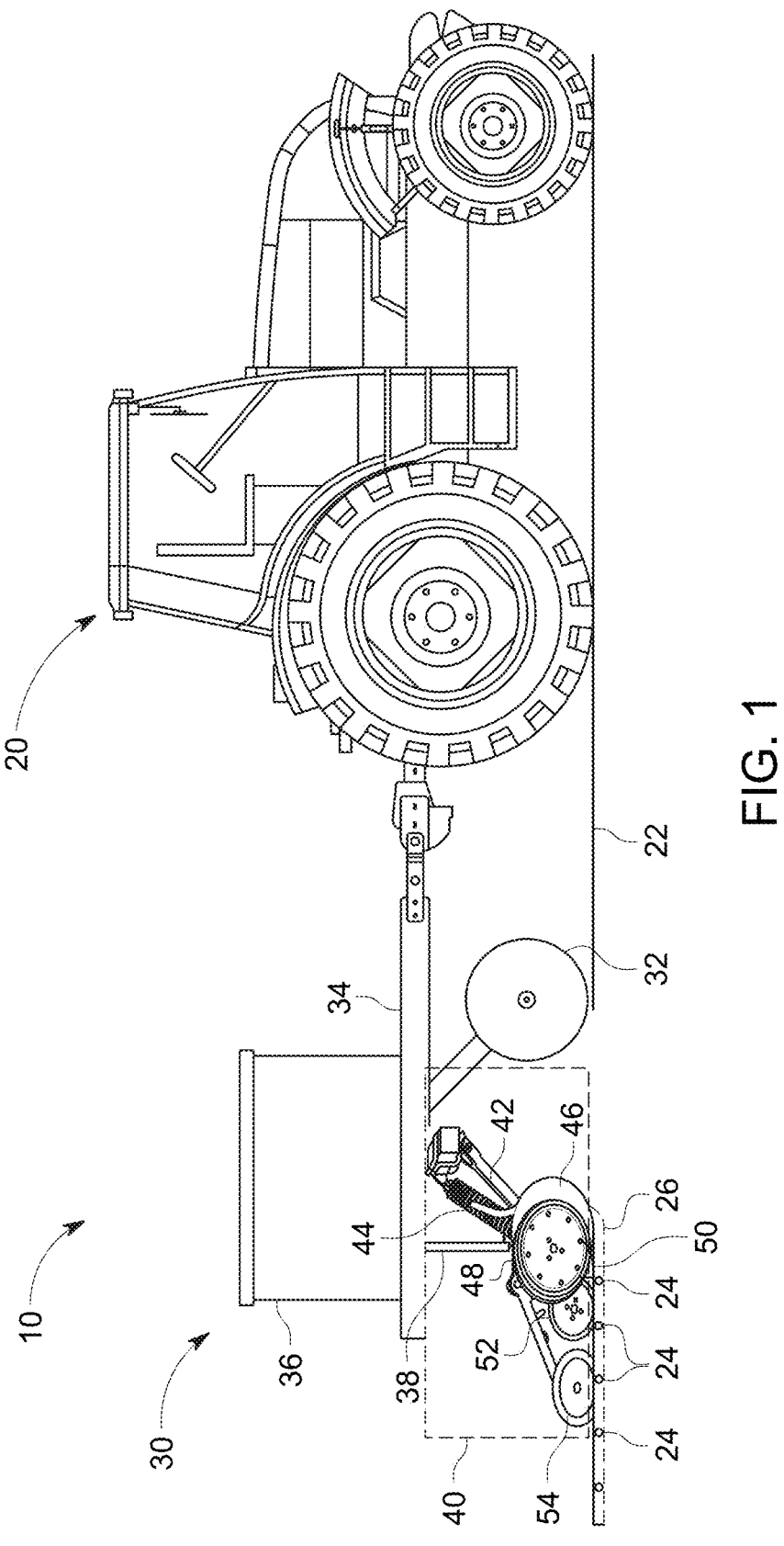
FIG. 1 is a side elevational view of an operating environment in which a seed boot stabilizer in accordance with an example embodiment may be implemented.

FIG. 1 is a side elevational view of an operating environment 10 in which a seed boot stabilizer 100 in accordance with an example embodiment may be implemented. It will be appreciated that the operating environment 10 shown in FIG. 1 is merely one possible environment in which embodiments of seed boot stabilizers 100 in accordance with the present disclosure may be implemented, and is presented to facilitate an understanding of the exemplary embodiments disclosed herein. Accordingly, the exemplary embodiments of seed boot stabilizers 100 disclosed herein should not be construed as being limited to the particular operating environment 10 shown in FIG. 1.

As shown in FIG. 1, in some embodiments, a tractor 20 may pull an air planter 30 over a ground surface 22 to plant one or more rows of seeds 24. The air planter 30 typically includes a series of components that operate to efficiently plant each row of seeds 24. For example, the air planter 30 may include a cleaner wheel 32 that leads along each row to be planted and has blades that help to cut and remove debris along the row where the seeds 24 will be planted. The air planter 30 may also include one or more planter assemblies 40 that perform the actual depositing of the seeds 24 into the ground. Typically, the planter assembly 40 includes a seed boot 50 that is subject to substantial contact with a ground surface 22 as the air planter 30 is moved across the ground surface 22, causing stress on a mounting assembly 70 that secures the seed boot 30 to other components of the air planter 30.

Accordingly, in some embodiments, a seed boot stabilizer 80 for maintaining a stability of a seed boot 50 relative to a main arm 42 of the air planter 30 includes a first segment 86, a second segment 87, and a third segment 88. In some embodiments, the first segment 86 includes a first end 82 configured to be coupled to the seed boot 50 and having a first planar face 96 configured to extend away from an upper portion of the seed boot 50. In some embodiments, the second segment 87 is coupled to the first segment 86 and has a second planar face 97 oriented at a first angle 85 with respect to the first planar face 96 of the first segment 86. In some embodiments, the third segment 88 is coupled to the second segment 86 and has a third planar face 98 oriented at a second angle 89 with respect to the second planar face 97 of the second segment 87, the third segment 88 including a second end 84 configured to be coupled to the main arm 42 to at least partially reduce movement of the seed boot 50 relative to the main arm 42.

Further aspects and alternate embodiments of seed boot stabilizers 80 in accordance with the present disclosure are described more fully below.

B. Planter Assembly

As noted above and shown in FIG. 1, the air planter 30 includes one or more planter assemblies 40 that perform the actual depositing of the seeds 24 into the ground. For example, in some embodiments, each planter assembly 40 includes an arm assembly 41 having a main arm 42 that is attached to a frame 34 of the air planter 30, and a control arm 44 that is attached between the frame 34 and the main arm 42 and enables controllable adjustment of the position of the main arm 42. In FIG. 1, the main arm 42 extends downwardly from the frame 34 in a lowered position into engagement with the ground surface 22 to perform planting operations.

In some embodiments, the planter assembly 40 further includes an opener wheel 46 that is attached to the main arm 42 and is positioned to open the ground and create a trench 26 into which the seeds 24 will be deposited. A gauge wheel 48 rolls along the ground surface 22 proximate the newly opened trench 26 and causes seeds 24 from a seed supply 36 (e.g. seed box, hopper, etc.) to be ejected through a seed tube 38 into a seed boot 50 to be deposited into the trench 26 at a desired spacing. In some embodiments, the planter assembly 40 further includes a press wheel 52 that rolls over the seeds 24 in the trench 26, and a closing wheel 54 that is configured to push dirt back into the trench 26 to cover the seeds 24. In this way, the planter 30 efficiently and effectively plants each row of seeds 24. By duplicating the above-noted planter assembly 40 in a side-by-side orientation, the air planter 30 may be configured to plant numerous rows of seeds 24 simultaneously (e.g. 12-48 rows).

Figure 2:
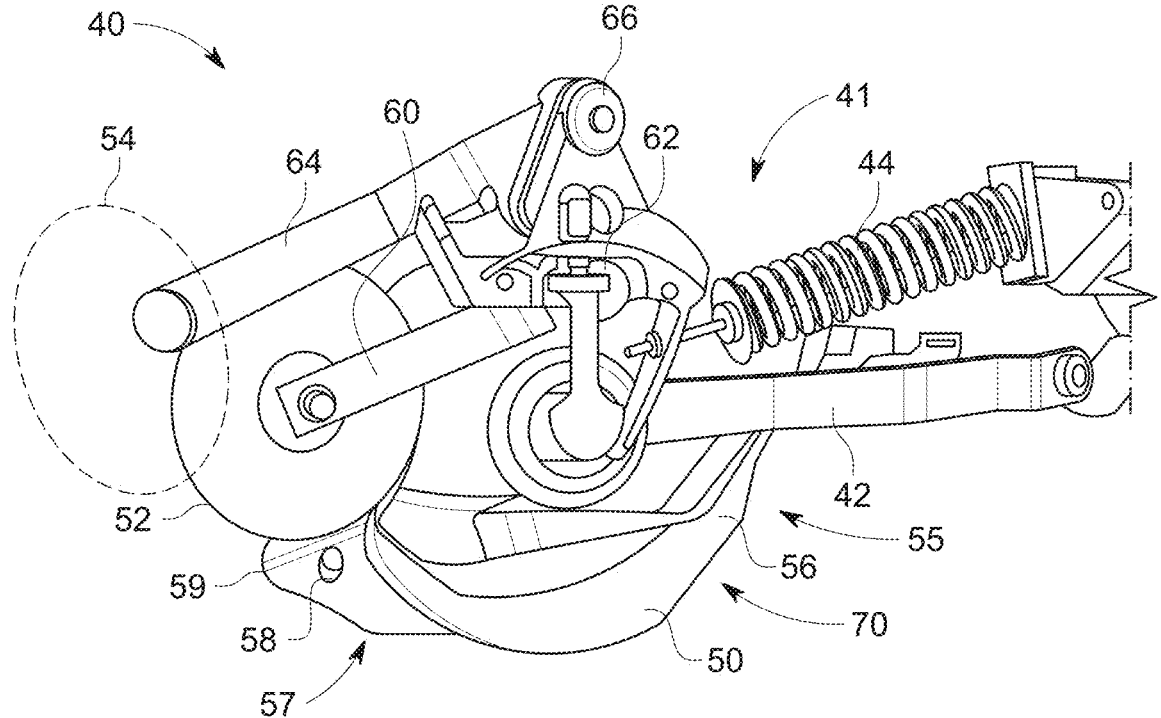
FIG. 2 is a side elevational, partially disassembled view of a planter assembly in accordance with an example embodiment.

FIG. 2 is a side elevational, partially disassembled view of the planter assembly 40 of the air planter 30 of FIG. 1 in accordance with an example embodiment. In FIG. 2, the gauge wheel 48 has been removed so that the seed boot 50 is visible, and the control arm 44 of the arm assembly 41 has been actuated to raise the main arm 42 into a raised (or approximately horizontal) position (also raising the press wheel 52 and the closing wheel 54). In some embodiments, the press wheel 52 is coupled to a press wheel spar 60 that is, in turn, rotatably attached to a press wheel mounting aperture 62 of the main arm 42. Similarly, in some embodiments, the closing wheel 52 is coupled to a closing wheel spar 64 that is, in turn, rotatably attached to a closing wheel mounting aperture 64 of the main arm 42. As described more fully below, the seed boot 50 is operatively coupled to other portions of the air planter 30 by a mounting assembly 70 in accordance with the present disclosure.

Accordingly, in some embodiments, a planter assembly 40 for an air planter 30 comprises: an arm assembly 41 including a main arm 42 having at least one mounting projection 43; a seed boot 50 having a seed inlet port 56 disposed within a forward end 55 thereof, and a seed exit port 58 disposed within a rearward end 57 thereof; a mounting assembly 70 operatively coupling the seed boot 50 to the arm assembly 41, the mounting assembly 70 including: a mounting flange 72 coupled to the seed boot 50 proximate the forward end 55 of the seed boot 50, the mounting flange 72 being pivotably coupled to the at least one mounting projection 43 of the main arm 42; and a seed boot stabilizer 80 including: a first segment 86 having a first end 82 configured to be coupled to the seed boot 50 proximate the rearward end 57 of the seed boot 50, the first segment 86 having a first planar face 96 configured to extend away from an upper portion of the seed boot 50; a second segment 87 coupled to the first segment 86 and having a second planar face 97 oriented at a first angle 85 with respect to the first planar face 96 of the first segment 86; and a third segment 88 coupled to the second segment 87 and having a third planar face 97 oriented at a second angle 89 with respect to the second planar face 97 of the second segment 87, the third segment 88 including a second end 84 coupled to a rearward portion 45 of the main arm 42 to at least partially reduce movement of the seed boot 50 relative to the main arm 42.

In some embodiments, the mounting flange 72 is coupled to the seed boot 50 proximate the seed inlet port 56, and wherein the first end 82 is coupled to the seed boot 50 proximate the seed exit port 58. And in some embodiments, the at least one mounting projection 43 comprises a pair of mounting projections 43 that project laterally outwardly from the main arm 42.

In addition, in some embodiments, the first and second angles 85, 89 are configured such that the third planar face 98 of the third segment 88 is approximately parallel with the first planar face 96 of the first segment 86. And in some embodiments, the arm assembly 41 comprises a control arm 44 operatively coupled to the main arm 42, the control arm 44 configured to controllably adjust a position of the main arm 42. Also, in some embodiments, the arm assembly 41 further includes a press wheel 52 operatively coupled to the main arm 42 by a press wheel spar 60, and a closing wheel 54 operatively coupled to the main arm 42 by a closing wheel spar 64.

C. Seed Boot and Mounting Assembly

As further shown in FIG. 2, the seed boot 50 includes a seed inlet port 56 that is coupled to the seed tube 38 (FIG. 1) proximate a forward end 55 of the seed boot 50. The seed inlet port 56 receives the seeds 24 that are to be planted from the seed tube 38. Similarly, the seed boot 50 includes a seed exit port 58 near a rearward end 57 of the seed boot 50. The seeds 24 that are being planted exit from the seed boot 50 via the seed exit port 58. In some embodiments, the seed boot 50 includes a seed tab 59 proximate the seed exit port 58 that serves to deflect the seeds 24 into the trench 26 during planting operations.

Figure 4:
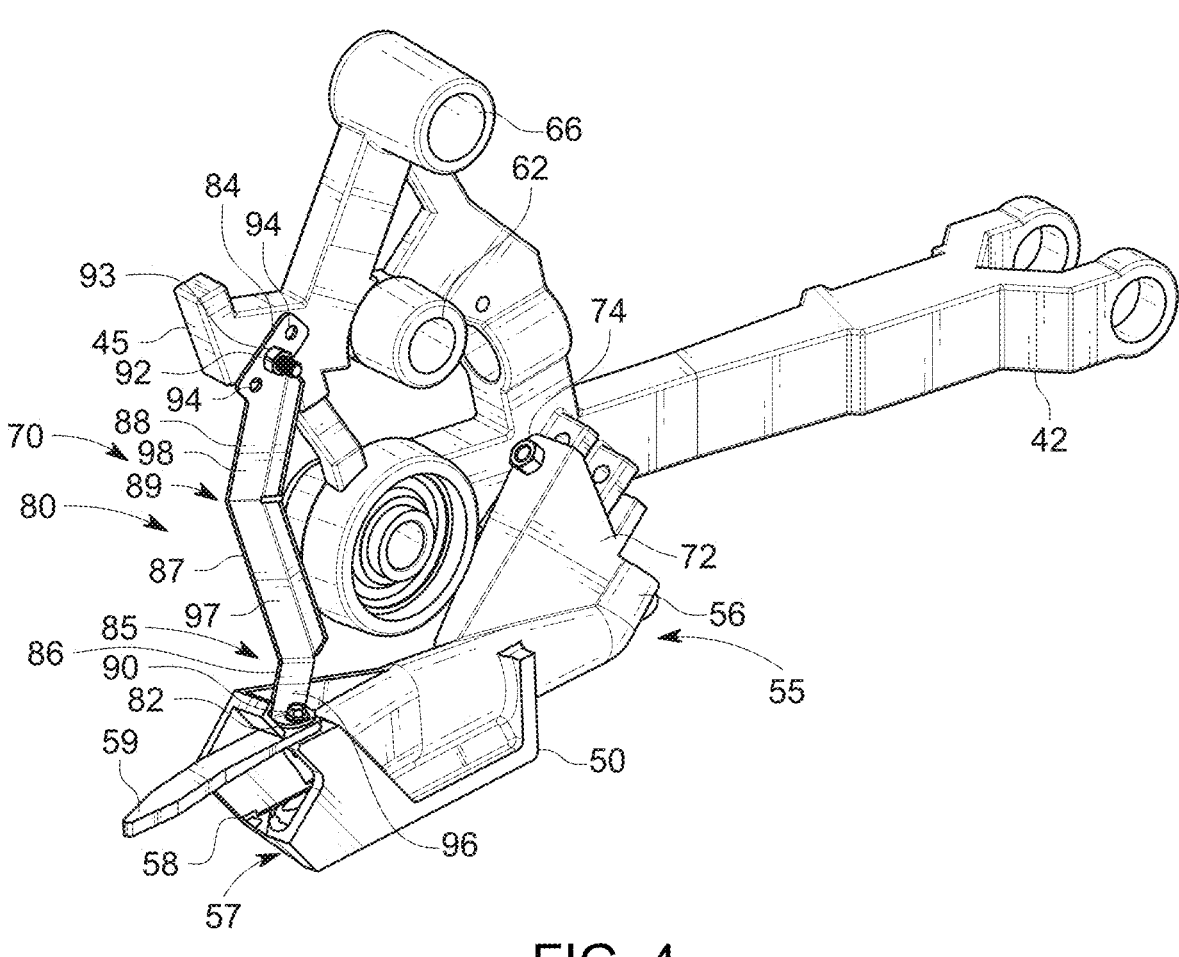
FIG. 4 is a second perspective view of the mounting assembly of FIG. 3 in accordance with an example embodiment.

The seed boot 50 is operatively coupled to other portions of the air planter 30 by a mounting assembly 70 in accordance with the present disclosure. For example, FIGS. 3-8 show various perspective, elevational, and exploded views of the mounting assembly 70 for the seed boot 50 in accordance with an example embodiment. In some embodiments, the mounting assembly 70 includes a mounting flange 72 that extends outwardly from the seed boot 50 proximate the forward end 55 of the seed boot 50. The mounting flange 72 may be pivotably coupled to the main arm 42, enabling the seed boot 50 to pivot with respect to the main arm 42. For example, as shown in FIGS. 3-5, in some embodiments, a mounting pin 74 (e.g. bolt) extends through holes (or apertures) formed in the mounting flange 72 and in a pair of mounting projections 43 that extend laterally outwardly from the main arm 42, pivotably securing the forward end 55 of the seed boot 50 to the main arm 42.

As further shown in FIGS. 3-8, the mounting assembly 70 may further include a seed boot stabilizer 80. For example, FIGS. 9-12 show various perspective and elevational views of the seed boot stabilizer 80 of the mounting assembly 70 in accordance with an example embodiment. In some embodiments, the seed boot stabilizer 80 includes a first end 82 coupled to the seed boot 50 proximate the rearward end 57 of the seed boot 50, and a second end 84 coupled to the main arm 42 proximate a rearward portion 45 of the main arm 42. The first end 82 may be coupled to the seed boot 50 in any suitable manner, including, for example, with one or more fasteners (e.g. screws, bolts, rivets, etc.), welding, or any other suitable manner. Similarly, in some embodiments, the second end 84 is coupled to the rearward portion 45 proximate the press wheel mounting aperture 62 of the main arm 42. The second end 84 may be coupled to the main arm 42 in any suitable manner, including, for example, with one or more fasteners (e.g. screws, bolts, rivets, etc.), welding, or any other suitable manner.

It will be appreciated that the seed boot stabilizer 80 may be configured to at least partially reduce movement of the seed boot 50 in relation to the main arm 42 of the arm assembly 41. More specifically, in some embodiments, the seed boot stabilizer 80 may act as a stiffening brace that connects the seed boot 50 to the main arm 42 of the arm assembly 41, reducing movements of the seed boot 50 during the performance of planting operations that may cause undesirable wear and tear on other components of the mounting assembly 70, including, for example, one or more of the mounting bracket 72, the mounting pin 74, the mounting projections 43, and the holes disposed therethrough.

In some embodiments, the seed boot stabilizer 80 may include a plurality of segments. For example, in the embodiment shown in FIGS. 3-12, the seed boot stabilizer 80 includes a first segment 86, a second segment 87 coupled to the first segment 86, and a third segment 88 coupled to the second segment 87. In some embodiments, the first segment 86 includes the first end 82 that is coupled to the seed boot 50, and the third segment 88 includes the second end 84 that is coupled to the main arm 42. More specifically, in some embodiments, the first segment 86 includes the first end 82 that is configured to be coupled to the seed boot 50 proximate the rearward end 57 of the seed boot 50, and the third segment 88 includes the second end 84 that is configured to be coupled to the rearward portion 45 of the main arm 42. In some embodiments, the first end 82 is coupled to the rearward end 57 proximate the seed exit port 58 of the seed boot 50. And in some embodiments, the second end 84 is coupled to the rearward portion 45 proximate the press wheel mounting aperture 62 of the main arm 42.

As further shown in FIGS. 3-12, in some embodiments, the first segment 86 includes a first planar face 96 that projects upwardly from the seed boot 50, and the second segment 87 includes a second planar face 97 that is oriented at a first angle 85 with respect to the first planar face 96 of the first segment 86. Similarly, the third segment 88 includes a third planar face 98 that is oriented at a second angle 89 with respect to the second planar face 97 of the second segment 87.

More specifically, in some embodiments, the first planar face 96 of the first segment 86 projects approximately vertically from the seed boot 50, and the second planar face 97 of the second segment 87 is oriented at the first angle 85 with respect to the first planar face 96 such that the second segment 87 projects laterally inwardly from an upper end of the first segment 86 toward the main arm 42 of the arm assembly 41. Similarly, in some embodiments, the third planar face 98 of the third segment 88 is angled at the second angle 89 with respect to the second planar face 97 of the second segment 87 such that the third segment 88 projects upwardly from an upper end of the second segment 87 with the third planar face 98 of the third segment 88 positioned in an approximately parallel orientation with the first planar face 96 of the first segment 86.

Accordingly, in some embodiments, a seed boot stabilizer 80 for maintaining a stability of a seed boot 50 relative to a main arm 42 of the air planter 30 includes a first segment 86, a second segment 87, and a third segment 88. In some embodiments, the first segment 86 includes a first end 82 configured to be coupled to the seed boot 50 and having a first planar face 96 configured to extend away from an upper portion of the seed boot 50. In some embodiments, the second segment 87 is coupled to the first segment 86 and has a second planar face 97 oriented at a first angle 85 with respect to the first planar face 96 of the first segment 86. In some embodiments, the third segment 88 is coupled to the second segment 86 and has a third planar face 98 oriented at a second angle 89 with respect to the second planar face 97 of the second segment 87, the third segment 88 including a second end 84 configured to be coupled to the main arm 42 to at least partially reduce movement of the seed boot 50 relative to the main arm 42.

More specifically, in some embodiments, the first end 82 is configured to be coupled to the seed boot 50 proximate a rearward end 57 of the seed boot 50, and the second end is configured to be coupled to a rearward portion 45 of the main arm 42. And in some embodiments, the first and second angles 85, 89 are configured such that the third planar face 98 of the third segment 88 is approximately parallel with the first planar face 96 of the first segment 86. In addition, in some embodiments, the first planar face 96 of the first segment 86 is configured to project approximately vertically from an upper portion of the seed boot 50, and the second planar face 97 of the second segment 87 is oriented at the first angle 85 with respect to the first planar face 96 such that the second segment 87 is configured to project laterally inwardly from an upper end of the first segment 86 toward the main arm 42. And in some embodiments, the third planar face 98 of the third segment 88 is angled at the second angle 89 with respect to the second planar face 97 of the second segment 87 such that the third segment 88 is configured to project upwardly from an upper end of the second segment 87 with the third planar face 98 of the third segment 88 positioned in an approximately parallel orientation with the first planar face 96 of the first segment 86.

In some embodiments, the seed boot stabilizer 80 may be formed of a single, unitary piece of suitably durable material. For example, in some embodiments, the seed boot stabilizer 80 may be formed from a sheet of metal (e.g. steel) that is stamped (or cut) and then bent into a suitable shape to provide the seed boot stabilizer 80. More specifically, in some embodiments, the segments 86, 87, 88 are stamped to maintain collinear (or parallel) position of faces of the first and third planar faces 96, 98 of the first and third segments 86, 88, respectively.

In addition, in some embodiments, the first angle 85 may be formed by bending a single, unitary piece of material to form a bend between the first and second segments 86, 87. Similarly, in some embodiments, the second angle 89 may be formed by bending a single, unitary piece of material to form a bend between the second and third segments 87, 88. In some embodiments, at least one of the first and second angles 85, 89 may be relatively stiff, forming one or more relatively stiff connections between the first and second segments 86, 87 and/or between the second and third segments 87, 88 that may be configured to stabilize the seed boot 50 relative to the main arm 42 during planting operations. In some embodiments, however, at least one of the first and second angles 85, 89 may be relatively flexible, forming one or more relatively flexible connections between the first and second segments 86, 87 and/or between the second and third segments 87, 88 that may be configured to provide flexibility of the seed boot stabilizer 80 to at least partially absorb shocks or blows that may occur to the seed boot 50 during planting operations without causing damage or breakage of the seed boot 50 and/or the seed boot stabilizer 80.

In addition, in some embodiments, one or more of the segments 86, 87, 88 may be shaped to form one or more segments 86, 87, 88 having an angled or L-shaped cross-sectional shape to provide improved strength or rigidity to the one or more segments 86, 87, 88. For example, in the embodiment shown in FIGS. 3-12, the second segment 87 is shaped to provide an angled or L-shaped cross-sectional shape, and the third segment 88 is also shaped to provide an angled or L-shaped cross-sectional shape. It will be appreciated that the cross-sectional shapes of the second and third segments 87, 88 may be formed in any suitable manner, including, for example, by bending single piece of material to provide the desired cross-sectional shape.

Accordingly, in some embodiments, the first, second, and third segments 86, 87, 88 of the seed boot stabilizer 80 are formed of a single, unitary piece of material. And in some embodiments, the first angle 85 comprises a first bend formed by bending the first segment 86 relative to the second segment 87, and the second angle 89 comprises a second bend formed by bending the third segment 88 relative to the second segment 87. Also, in some embodiments, at least one of the first, second, and third segments 86, 87, 88 comprises a segment having an L-shaped cross-sectional shape.

In some embodiments, where the first end 82 is coupled to the seed boot 50 using a screw, bolt, or other similar fastener, the first end 82 may include one or more holes or slots therethrough. In the embodiment shown in FIGS. 3-12, a first bolt 90 is engaged through a slot disposed in the first end 82 and threadedly engages with a threaded hole disposed in the seed boot 50. It will be appreciated that, in some embodiments, the first bolt 90 may also be used to attach the seed tab 59 to the seed boot 50. Similarly, in some embodiments, where the second end 88 is coupled to the main arm 42 using a screw, bolt, or other similar fastener, the second end 84 may including one or more holes or slots therethrough. In the embodiment shown in FIGS. 3-12, a second bolt 90 is engaged through one of three mounting holes 94 disposed in the second end 82 and threadedly engages with a mounting nut 93, attaching the second end 84 to the main arm 42.

Accordingly, in some embodiments, a mounting assembly 70 for a seed boot 50 having a mounting flange 72 proximate a forward end 55 of the seed boot 50 that is pivotably coupled to at least one mounting projection 43 of a main arm 42, the mounting assembly 70 comprising: a seed boot stabilizer 80 including: a first segment 86 having a first end 82 configured to be coupled to the seed boot 50 proximate a rearward end 57 of the seed boot 50, the first segment 86 having a first planar face 96 configured to extend away from an upper portion of the seed boot 50; a second segment 87 coupled to the first segment 86 and having a second planar face 97 oriented at a first angle 85 with respect to the first planar face 96 of the first segment 86; and a third segment 88 coupled to the second segment 87 and having a third planar face 98 oriented at a second angle 89 with respect to the second planar face 97 of the second segment 87, the third segment 88 including a second end 84 configured to be coupled to a rearward portion 45 of the main arm 42 to at least partially reduce movement of the seed boot 50 relative to the main arm 42.

Furthermore, in some embodiments, the mounting flange 72 is proximate a seed inlet port 56 disposed with the forward end 55 of the seed boot 50, and wherein the first end 82 is configured to be coupled to the seed boot 50 proximate a seed exit port 58 disposed within the rearward end 57 of the seed boot 50. And in some embodiments, the mounting flange 72 is pivotably coupled to a pair of mounting projections 43 that project laterally outwardly from the main arm 42 by a mounting pin 74 that projects through one or more holes disposed within the mounting flange 72 and the pair of mounting projections 43. In some embodiments, the first and second angles 85, 89 are configured such that the third planar face 98 of the third segment 88 is approximately parallel with the first planar face 96 of the first segment 86. And in some embodiments, the mounting assembly 70 further includes the main arm 42 having at least one mounting projection 43 that is pivotably coupled to the mounting flange 72, the main arm 42 including the rearward portion 45 that is coupled to the second end 84 of the seed boot stabilizer 80. Additionally, in some embodiments, the rearward portion 45 of the main arm 42 is proximate a press wheel mounting aperture 62 disposed within the main arm 42.

It will be appreciated that seed boot stabilizers in accordance with the present disclosure may provide considerable advantages. For example, in some embodiments, seed boot stabilizers (e.g. seed boot stabilizer 80) in accordance with the present disclosure may at least partially reduce movement of the seed boot 50 during the performance of planting operations that may cause undesirable wear and tear on other components of the mounting assembly 70, including, for example, one or more of the mounting bracket 72, the mounting pin 74, the mounting projections 43, and the holes disposed therethrough. Therefore, embodiments in accordance with the present disclosure may reduce or eliminate improper seed placement during planting operations, as well as mitigating failures of the mounting structure that result in replacement costs and undesirable delays in agricultural operations.

In addition, embodiments in accordance with the present disclosure may advantageously increase tool life by reducing overall stress on the mounting projections 43 of the main arm 42, and by increasing spring tension on the disk (or press wheel 52). By increasing such spring tension (which exerts an upward force on the rearward end 57 of the seed boot 50), embodiments in accordance with the present disclosure may advantageously reduce the interaction of the seed boot 50 with the walls of the trench 26 in the ground surface 22 during planting operations, thereby reducing abrasive wear on the lower portion of the seed boot 50.

While various embodiments have been described above, it should be understood that they have been presented by way of example only, and not limitation. The descriptions are not intended to limit the scope of the technology to the particular forms set forth herein. To the contrary, the present descriptions are intended to cover such alternatives, modifications, and equivalents as may be included within the spirit and scope of the technology as defined by the appended claims and otherwise appreciated by one of ordinary skill in the art. The various embodiments of the present disclosure may be embodied in other specific forms without departing from the spirit or essential attributes thereof, and it is therefore desired that the various embodiments in the present disclosure be considered in all respects as illustrative and not restrictive. Thus, the breadth and scope of a preferred embodiment should not be limited by any of the above-described exemplary embodiments.

Unless otherwise defined, all technical and scientific terms used herein have the same meaning as commonly understood by one of ordinary skill in the art to which this invention belongs. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. Any headings utilized within the description are for convenience only and have no legal or limiting effect.

What is claimed is:

1. A seed boot stabilizer for maintaining a stability of a seed boot relative to a main arm, comprising:
   a first segment having a first end configured to be coupled to a seed boot and having a first planar face configured to extend away from an upper portion of the seed boot;
   a second segment coupled to the first segment and having a second planar face oriented at a first angle with respect to the first planar face of the first segment; and
   a third segment coupled to the second segment and having a third planar face oriented at a second angle with respect to the second planar face of the second segment, the third segment including a second end configured to be coupled to a main arm to at least partially reduce movement of the seed boot relative to the main arm.

2. The seed boot stabilizer of claim 1, wherein the first end is configured to be coupled to the seed boot proximate a rearward end of the seed boot, and the second end is configured to be coupled to a rearward portion of the main arm.

3. The seed boot stabilizer of claim 1, wherein the first and second angles are configured such that the third planar face of the third segment is approximately parallel with the first planar face of the first segment.

4. The seed boot stabilizer of claim 1, wherein the first planar face of the first segment is configured to project approximately vertically from an upper portion of the seed boot, and the second planar face of the second segment is oriented at the first angle with respect to the first planar face such that the second segment is configured to project laterally inwardly from an upper end of the first segment toward the main arm.

5. The seed boot stabilizer of claim 4, wherein the third planar face of the third segment is angled at the second angle with respect to the second planar face of the second segment such that the third segment is configured to project upwardly from an upper end of the second segment with the third planar face of the third segment positioned in an approximately parallel orientation with the first planar face of the first segment.

6. The seed boot stabilizer of claim 1, wherein the first, second, and third segments are formed of a single, unitary piece of material.

7. The seed boot stabilizer of claim 6, wherein the first angle comprises a first bend formed by bending the first segment relative to the second segment, and wherein the second angle comprises a second bend formed by bending the third segment relative to the second segment.

8. The seed boot stabilizer of claim 1, wherein at least one of the first, second, and third segments comprises a segment having an L-shaped cross-sectional shape.

9. A mounting assembly for a seed boot having a mounting flange proximate a forward end of the seed boot that is pivotably coupled to at least one mounting projection of a main arm, the mounting assembly comprising:

a seed boot stabilizer including:

a first segment having a first end configured to be coupled to the seed boot proximate a rearward end of the seed boot, the first segment having a first planar face configured to extend away from an upper portion of the seed boot;

a second segment coupled to the first segment and having a second planar face oriented at a first angle with respect to the first planar face of the first segment; and a third segment coupled to the second segment and having a third planar face oriented at a second angle with respect to the second planar face of the second segment, the third segment including a second end configured to be coupled to a rearward portion of the main arm to at least partially reduce movement of the seed boot relative to the main arm.

10. The mounting assembly of claim 9, wherein the mounting flange is proximate a seed inlet port disposed with the forward end of the seed boot, and wherein the first end is configured to be coupled to the seed boot proximate a seed exit port disposed within the rearward end of the seed boot.

11. The mounting assembly of claim 9, wherein the mounting flange is pivotably coupled to a pair of mounting projections that project laterally outwardly from the main arm by a mounting pin that projects through one or more holes disposed within the mounting flange and the pair of mounting projections.

12. The mounting assembly of claim 9, wherein the first and second angles are configured such that the third planar face of the third segment is approximately parallel with the first planar face of the first segment.

13. The mounting assembly of claim 9, further comprising the main arm having at least one mounting projection that is pivotably coupled to the mounting flange, the main arm including the rearward portion that is coupled to the second end of the seed boot stabilizer.

14. The mounting assembly of claim 13, wherein the rearward portion of the main arm is proximate a press wheel mounting aperture disposed within the main arm.

15. A planter assembly for an air planter, comprising:

an arm assembly including a main arm having at least one mounting projection;

a seed boot having a seed inlet port disposed within a forward end thereof, and a seed exit port disposed within a rearward end thereof;

a mounting assembly operatively coupling the seed boot to the arm assembly, the mounting assembly including:

a mounting flange coupled to the seed boot proximate the forward end of the seed boot, the mounting flange being pivotably coupled to the at least one mounting projection of the main arm; and a seed boot stabilizer including:

a first segment having a first end configured to be coupled to the seed boot proximate the rearward end of the seed boot, the first segment having a first planar face configured to extend away from an upper portion of the seed boot;

a second segment coupled to the first segment and having a second planar face oriented at a first angle with respect to the first planar face of the first segment; and a third segment coupled to the second segment and having a third planar face oriented at a second angle with respect to the second planar face of the second segment, the third segment including a second end coupled to a rearward portion of the main arm to at least partially reduce movement of the seed boot relative to the main arm.

16. The planter assembly of claim 15, wherein the mounting flange is coupled to the seed boot proximate the seed inlet port, and wherein the first end is coupled to the seed boot proximate the seed exit port.

17. The planter assembly of claim 15, wherein the at least one mounting projection comprises a pair of mounting projections that project laterally outwardly from the main arm.

18. The planter assembly of claim 15, wherein the first and second angles are configured such that the third planar face of the third segment is approximately parallel with the first planar face of the first segment.

19. The planter assembly of claim 15, wherein the arm assembly comprises a control arm operatively coupled to the main arm, the control arm configured to controllably adjust a position of the main arm.

20. The planter assembly of claim 15, wherein the arm assembly further includes a press wheel operatively coupled to the main arm by a press wheel spar, and a closing wheel operatively coupled to the main arm by a closing wheel spar.

* * * * *